Nov. 2, 1971   M. J. GOLIS ET AL   3,616,682

ULTRASONIC NONDESTRUCTIVE THICKNESS GAUGE

Filed Sept. 23, 1968   4 Sheets-Sheet 1

INVENTORS
MATTHEW J. GOLIS
ROBERT C. McMASTER
BY GARY L. COOPER

ATTORNEY (a.)

(b.)

(c.)

INVENTORS
MATHEW J. GOLIS
ROBERT C. McMASTER
BY GARY L. COOPER

ATTORNEY

United States Patent Office 3,616,682
Patented Nov. 2, 1971

3,616,682
ULTRASONIC NONDESTRUCTIVE
THICKNESS GAUGE
Matthew J. Golis, Robert C. McMaster, and Gary L.
Cooper, Columbus, Ohio, assignors to The Ohio State
University, Columbus, Ohio
Filed Sept. 23, 1968, Ser. No. 761,645
Int. Cl. G01n 29/00
U.S. Cl. 73—67.7                                    8 Claims

ABSTRACT OF THE DISCLOSURE

The invention is for an ultrasonic transmitting and receiving device for the nondestructive measuring of the thickness of heterogeneous materials.

BACKGROUND

Nonhomogeneous materials have presented a difficult problem when a measurement of the material's thickness must be determined by nondestructive means. Examples of these materials include fiber glass, graphite, composite filamentary structures, and sintered powder metallics, i.e., solids composed of pressurized metal powders. The accurate measurement of portland cement concrete thicknesses by nondestructive means has long been sought by highway engineers and contractors as well as state and national agencies supporting highway construction and maintenance.

Ultrasonic test means, have, in the prior art, been limited in usefulness because accuracies better than ±5 percent were very difficult if not impossible to obtain. These test means employed combination transmitter-receiver transducers utilizing the same crystal for both the transmitting and receiving functions. This prevented good total equipment performance because, as known to those versed in the art, the characteristics of crystals are such that the same crystal cannot produce equally good performance as both a transmitter and a receiver. The transducer-transmitters of the prior art were generally no larger than 3"–4" and operated at a frequency of approximately 20,000 Hz. With an instantaneous power output of 1 kw. these transmitters produced a beam which spread quickly and was rapidly attenuated causing very little of the beam to be reflected back to the receiver.

SUMMARY

The invention relates to the ultrasonic nondestructive measurement of thickness in nonhomogeneous materials. The invention utilizes a high-power, large-area ultrasonic transmitter capable of highly directional operation. The transmitter is constructed in a circular shape. The ultrasonic receiver is concentrically located in the center of the transmitter. The transmitter is excited with a high-energy electrical pulse which is converted to a short-duration ultrasonic pulse which in turn propagates through the material on which the transmitter is placed. Although most heterogeneous materials have high rates of acoustic attenuation, the high-power, large-area combination permits relatively short wavelengths to be used with the result that detectable signals are available through the use of the receiver, located in the center of the transmitter. These signals are produced when the propagated signal is reflected back towards the transmitter from the opposite side of the material under test or from honeycombs, cracks or general degradation of the material.

The thickness measurements are made by observing the amount of time it takes an ultrasonic pulse to travel from the transmitter down through the material and be reflected back up into the vicinity of the receiver. Detectable signals and frequencies of operations of the order of 300 kHz. can be used with the invention to produce accuracies to the order of ±2 percent.

The present invention solves several problems previously existent in the prior art. The large area of the transmitter improves the beaming characteristics of the device and permits averaging of bottom surface roughness. The beaming characteristic and the resolution of bottom surface location are also improved by the use of higher transmitter frequencies. The use of a high-frequency receiver system permits signal identification through wave shape observation. The invention takes advantage of the natural characteristics of crystals by using separate crystals for transmitting and receiving. The invention applies up to five times the instantaneous power used by conventional gauges to compensate for signal attenuation in the material due to the presence of coarse aggregate.

OBJECTS

Accordingly it is a principal object of the invention to provide an improved ultrasonic thickness gauge.

Another object of the invention is to provide an ultrasonic thickness gauge which permits accurate, nondestructive measurement of the thickness of heterogeneous materials.

Another object of the invention is to provide an ultrasonic thickness gauge which permits averaging of bottom surface roughness.

A further object of the invention is to provide an ultrasonic thickness gauge which permits improved resolution of bottom surface location.

Still a further object of the invention is to provide an ultrasonic thickness gauge which permits the detection of small discontinuities and close monitoring of dimensional tolerances in heterogeneous materials.

For a complete understanding of the invention, together with other objects and advantages thereof, reference may be made to the accompanying drawings, in which:

DETAILED DESCRIPTION OF THE DRAWINGS

The following specification describes the application of the ultrasonic thickness gauge in the measurement of the thickness of portland cement concrete, in place, in highways. It is not intended to limit the scope of the invention to the measurement of this type of heterogeneous material. This material was chosen only for purposes of illustration.

Figure 1:
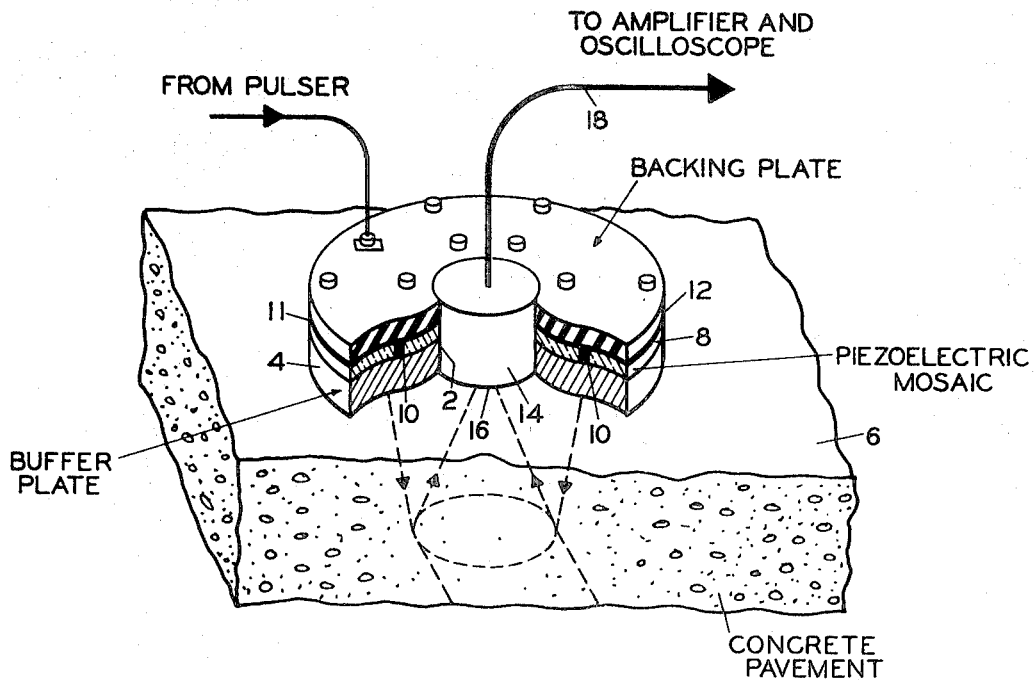
FIG. 1 is a sectional perspective view of the preferred embodiment of the invention as it would be used in the measurement of the thickness of hetereogeneous material.

The preferred embodiment of the invention is illustrated in FIG. 1. The transmitter-transducer 2 consists of a 3-inch aluminum buffer plate 4, which is shaped in the form of a toroid. This plate 4 provides a surface of contact with the material 6 under test and gives the gauge sufficient weight to make a good coupling between the transmitter 2 and the concrete pavement 6 for ultrasonic test purposes.

The aluminum plate 4 serves as a protective layer between the highly abrasive concrete surface 6 and a mosaic layer of piezoelectric material 8 which is mounted on the aluminum plate 4. A silicon releasing agent is placed between the piezoelectric mosaic layer 8 and the aluminum plate 4 which acts as an acoustical couplant.

Figure 2:
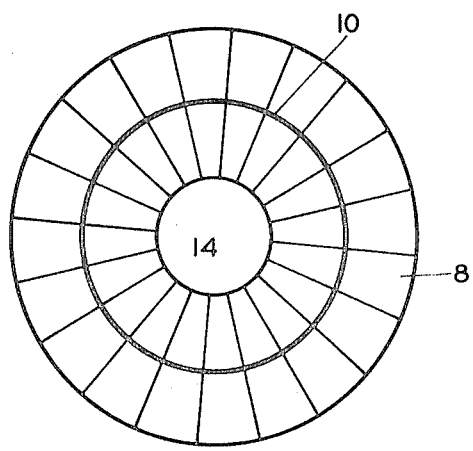
FIG. 2 is a top view of the piezoelectric mosaic layer of the preferred embodiment of the invention.

The mosaic configuration of the piezoelectric material is illustrated in FIG. 2. The individual triangular pieces of piezoelectric material 8 are electrically connected together so that the piezoelectric material 8 responds as one coherent layer to an electrical signal from the pulser. Mounted above the piezoelectric layer 8 is a conducting sheet 11 which permits electrical excitation of the piezoelectric layer 8. Positioned above this conducting sheet 11 is a backing plate 12 of a dielectric material which serves to protect the upper surface of the piezoelectric layer 8, to hold the piezoelectric material 8 in place, and to act as a damping means to keep the piezoelectric material 8 from continuing to expand and contract after the initial pulse. The piezoelectric layer 8 is divided into two concentric rings by a dielectric ring 10 which permits alternate excitation modes to be used, particularly for making measurements independent of absolute velocity as disclosed in an alternative embodiment herein.

In the geometrical center of the large transmitting radiator 2 is located an ultrasonic receiver 14. The reeciver 14 completely fills the cavity in the transmitter 2 and is placed so that its receiving end 16 is in good acoustical contact with the material 6 under test. The output 18 from the receiver 14 is fed to an amplifier and an oscilloscope.

Figure 3:
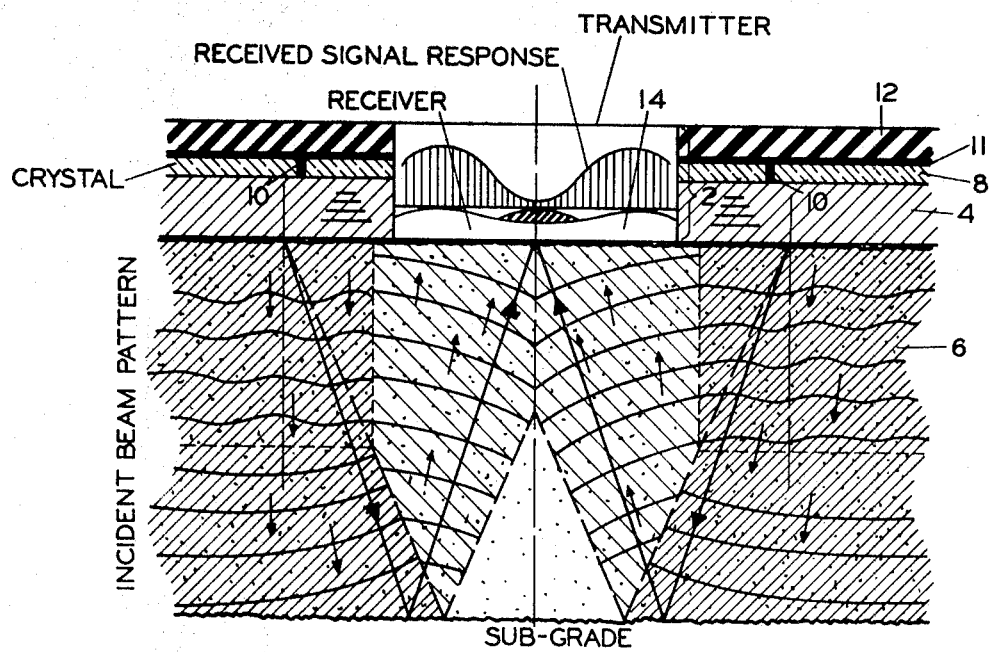
FIG. 3 is a schematic cross-sectional representation of the sound fields in the vicinity of the preferred embodiment of the invention when the invention is used in the measurement of the thickness of highway pavement.

The theory of the pavement thickness gauge is based on the fundamental concept of divergence of sound from a radiator. As shown in FIG. 3 as a pulse of ultrasound propagates down through the concrete, it spreads out. The pulse is therefore detectable by the receiver 14 located in the center of the transmitter 2. Having the receiver 14 physically separate from the transmitter 2 permits better isolation of transmitter noise from signal returns.

The model of the invention constructed for experimental purposes utilized in the transmitter-transducer a mosaic piezoelectric radiator composed of 20 segments of a modified barium titanate material. It has a characteristic thickness resonance frequency of 400 kHz. to which it responds when excited with an electrical impulse. When mounted in the transmitter assembly, this drops to about 300 kHz. With the mosaic layer responding acoustically as a single radiator when excited electrically, high-energy ultrasonic pulses distributed over a broad area are introduced into the pavement materials for thickness gaging purposes.

When a receiver is frequency-matched to an ultrasonic on-coming signal, the true shape of the received pulse is usually lost, although the output is high. As a result of experimentation it was found that bottom surface signals were identified by a characteristically high-frequency pulse. Therefore, a receiving transducer with natural resonant frequency well above the frequency of the incoming signal was chosen. For a 200–400 kHz. input signal, a 5 mHz. receiver was found to be the best of the available equipment. However, any broad ban receiver will provide adequate performance.

The pulser unit used in the field test is capable of delivering 50 kwatt—1 $\mu$sec. pulses. The unit providing the timing as well as the pulse excitation for the ultrasonic system is a typical multivibrator and thyratron pulser configuration. It was found that a simple single pulse of maximum available voltage was sufficient and distinguishable for use in the field tests.

Signals corresponding to reflected ultrasonic pulses from the bottom surface of the concrete had a higher frequency content than the surface noise and was therefore distinguishable by its unique sharpness. The presence of the high-frequency reflected pulse was observed using a general purpose field oscilloscope. The oscilloscope should be portable and capable of identifying time delays with accuracies of ±1 percent from a given starting pulse. The thickness measurements are critically dependent upon transit-time measurements and therefore the choice of an oscilloscope is very important. The electrical system used in the pavement thickness gauge is representative of a typical A-scan configuration often found in ultrasonic nondestructive testing. This type of presentation displays ultrasonic signal amplitude as a function of time.

Signal identification and interpretation are relatively simple. Nearly every signal will show low-frequency pulses at and around the time corresponding to the bottom thickness. Superimposed on the low frequency waveform is the bottom echo signal. The positive identification of the bottom surface reflected pulse (in the presence of background noise) is made by recognizing its unique high-frequency shape. Noise signals received in addition to the bottom surface signals are mostly at a frequency of about 10 kHz. as opposed to the 300–400 kHz. bottom reflection signal. Due to multiple reflections within the aluminum plate, a second transmitted pulse approximately 30 $\mu$sec. behind the initial pulse is transmitted and often assists in identifying the bottom reflection signals in the presence of excessive background noise. The oscilloscope adds the low frequency waveform and the bottom echo signals. The result is shown in FIG. 4.

Figure 4:
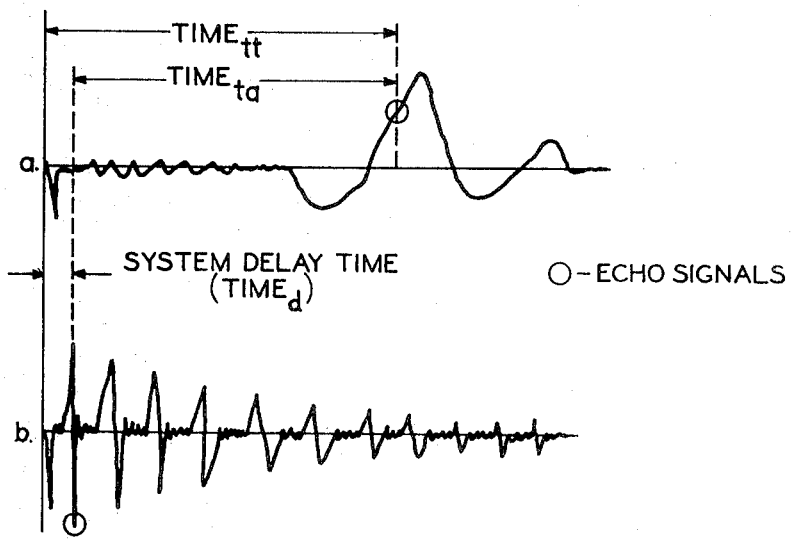
FIG. 4 is a graphical representation of the oscilloscope display of a satisfactory signal received by the ultrasonic receiver, in the arrangement illustrated in FIG. 3.

The labels in FIG. 4 refer to the main factors for consideration in the pavement depth calculation:

$T_{tt}$=total transit time from pulse initiation to received signal display.

$T_d$=delay time, or the length of time necessary for the pulse to traverse the aluminum block of the transmitter.

$T_{ta}$=actual transit time, or the length of time necessary for the pulse to traverse the distance from pavement top surface to bottom surface and back to the receiver.

In most cases, the oscilloscope has sufficient signal amplification capabilities to give a satisfactory presentation of signal shape on the screen. For those cases in which the received signal is weak and very close to the background noise level, additional amplification can be supplied by an external operational amplifier.

The operational amplifier is usually used for direct amplification of low-level signals. When identification of the received pulse is difficult, differentiation and amplification of the input signal may supply a uniquely clear indication of the received pulse. This follows since identification of the received signals is done through observation of a signal with a steeper slope than that of the background noise.

Figure 5:
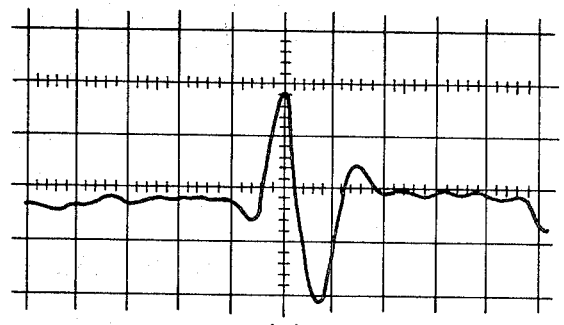
FIGS. 5a, 5b, and 5c are graphical representations of the oscilloscope displays of a reflected signals as observed at receiver, as differentiated once and as differentiated twice, respectively.
Figure 5:
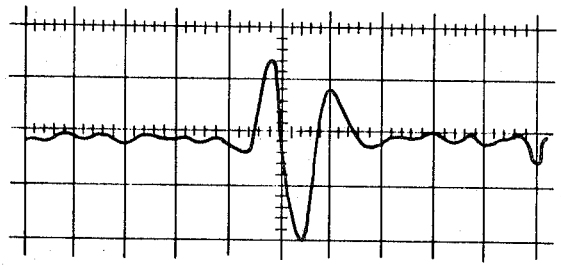
Figure 5:
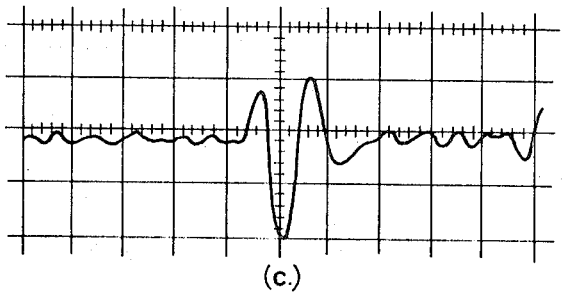

During field tests, under good conditions, the signal to noise ($S/N$) ratio was of the order of 2. When these signals are differentiated, their derivative is substantially larger than that of the background. The $S/N$ ratio is improved to 5 or better. FIG. 5 shows an example of a reflection signal and how it can be improved through multiple differentiation processes.

The pavement thickness gauge measures pavement thicknesses by monitoring the amount of time it takes an ultrasonic pulse to travel down through the concrete and back again. The distance the sound travels is related to the transit time and sound velocity by the expression:

$$d = 2T = Vt \qquad \text{Eq. 1}$$

where:

$d$=distance traveled (in.)
$T$=pavement thickness=$d/2$ (in.)
$V$=velocity of sound propagation (in./sec.)
$t$=transit time (sec.)

Once the transit time is measured, then the thickness can be readily calculated, given the speed of sound for the material. For example, a pavement 9 inches thick having a sound velocity of 144,000 in./sec. (12,000 ft./sec.) would have a measured transit time of $125(10)^{-6}$ sec. (125 $\mu$sec.). A pavement 10 inches thick with a velocity of 16,000 ft./sec. would have a transit time of 104 $\mu$sec. Thus, the technique for measuring pavement thickness is (1) to establish the sound velocity for the local pavement material and (2) to measure the transit times throughout the area.

The sound velocity can be obtained in various ways. One way is to take a transit time measurement for a pulse traveling down and back through the pavement. When this time is compared to a core's length taken from the same area, the velocity can be computed using Eq. 1. During field tests of the gauge it was found that thickness accuracies with $\pm 2.5\%$ could be attained by assuming an average velocity throughout the tests.

Due to the geometry of the transmitter and the location of the receiver, the ultrasonic beam path is not straight down and back, but rather follows a triangular path. The actually measured transit times are therefore slightly longer than those obtained by a pulse traveling straight down and back. This extra time corresponds to approximately 4 percent of the total transit time for the geometry used. However, it was found that an effective velocity could be used to describe the thickness of the pavement (effective signifying the velocity needed to describe the actual thickness given the measured transit time). Errors introduced by using this procedure are less than 1 percent in 8 to 10 inch pavements (highway pavements are typically 9 inches in depth).

Figure 6:
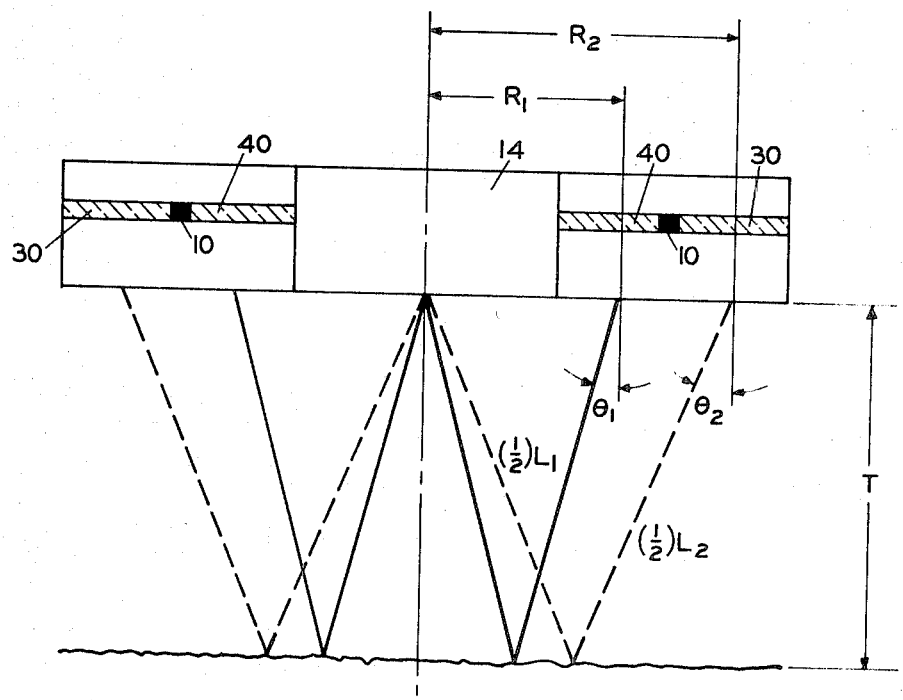
FIG. 6 is a schematic cross-sectional representation of the sound path locations and directions which would prevail in an alternative embodiment of the ultrasonic thickness gauge which would function independently of absolute velocity measurements; and, FIG. 7 is a cross-sectional diagrammatic representation of an alternative embodiment of the invention in which there is a plateau arrangement of the piezoelectric crystal that approximates a lens, thereby providing for focusing of the ultrasound waves.

A schematic cross-sectional representation of an alternative embodiment of the invention is illustrated in FIG. 6. This system measures thickness by monitoring the time it takes pulses traveling slightly differing paths to reach the receiver. Rather than have the entire ring devoted to a single source of ultrasonic energy, two concentric rings 30 and 40 are used as acoustic pulse sources at two separate distances from the receiver 14. The inner ring 40 with center-line at radius $R_1$ from the axis of symmetry supplies the pulse that travels path $L_1$. The outer ring 30 with center-line at radius $R_2$ from the axis of symmetry supplies the pulse that travels path $L_2$. The angles each of these paths make with the normal to the surface at the center of the region of pulse initiation are $\theta_1$ and $\theta_2$ respectively.

By the Pythagorean theorem, the path lengths are related to their respective radii by the expression:

$$L_1^2 = (4T^2 + R_1^2)$$
$$L_2^2 = (4T^2 + R_2^2)$$

where:

$L_n$=Diagonal path length for pavement surface to bottom and back again (in.)
$T$=Pavement thickness (in.)
$R_n$=Radii of transmitter center-lines (in.)

By the definition of average velocity, the length of time it takes a pulse to travel a given distance is expressed as:

$$t_n = L_n/V$$

where:

$t_n$=Transit time for $n$ length (sec.).
$L_n$=Path length (in.).
$V$=Velocity of propagation (in./sec.).

Thus, the velocity of sound propagation which is a constant in any given section of pavement material can be set equal to the corresponding times and lengths of travel path. Thus:

$$V = \frac{L_1}{t_1} = \frac{\sqrt{4T^2 + R_1^2}}{t_1} = \frac{L_2}{t_2} = \frac{\sqrt{4T^2 + R_2^2}}{t_2}$$

and $\qquad (4T^2 + R_1^2)t_2^2 = (4T^2 + R_2^2)t_1^2$

The equation above can be rewritten as:

$$T^2 = (r^2 R_2^2 - R_1^2)/4(1 - r^2)$$

where:

$r$=Ratio of the transit times=$t_1/t_2$.

From this equation the thickness T of the pavement can be determined when the transit time differences are measured with an accuracy to the order of $\frac{1}{2}$ of 1%. The unique feature of this pavement thickness gauge is its capability of measuring pavement thickness regardless of absolute sound velocity because the thickness measurements are made not on the absolute velocity but rather on the differential transit time and a simple trignometric mathematical relationship.

Figure 7:
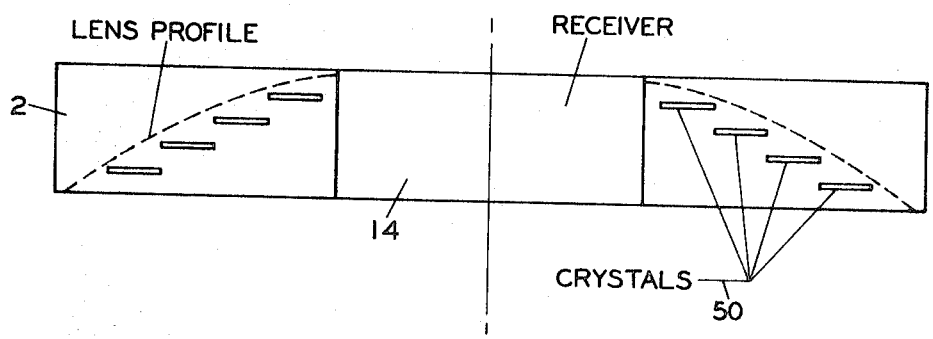

A cross-sectional diagrammatic representation of another alternative embodiment of the invention is illustrated in FIG. 7. This embodiment utilizes a plateau arrangement of the piezoelectric crystal 50 which approximates a lens configuration. This embodiment permits focusing of the ultrasound waves thereby increasing the amplitude of the signal received by the receiver 14 located in the geometrical center of the transmitter 2.

Although certain and specific embodiments have been illustrated, it is to be understood that modifications may be made without departing from the true spirit and scope of the invention.

What is claimed is:

1. An ultrasonic transmitting and receiving device for the nondestructive measuring of the thickness of heterogeneous materials, the improvements comprising a separate transmitter and receiver, said transmitter comprising a toroidal shaped ultrasonic radiator having a toroidal shaped conducting plate in acoustical contact with said heterogeneous material, a layer of piezoelectric crystal material comprising a pattern of a plurality of concentric rings, said piezoelectric layer positioned above said plate, said piezoelectric layer having substantially the same horizontal cross sectional outline of said plate, pulse means for sequentially actuating said piezoelectric layer, said layer having a configuration to focus the ultrasonic waves emanating from said piezoelectric layer; means for retaining and damping the oscillations of said piezoelectric layer, said last mentioned means comprising a layer of dielectric material positioned above said piezoelectric layer; and said receiver positioned in the geometrical center of said toroidal shaped transmitter.

2. An ultrasonic transmitting and receiving device as set forth in claim 1 wherein said piezoelectric layer comprises piezoelectric segments in a mosaic.

3. An ultrasonic transmitting and receiving device as set forth in claim 2 wherein said mosaic layer of piezoelectric crystal material comprises a pattern of pie-shaped segments of piezoelectric material.

4. An ultrasonic transmitting and receiving device as set forth in claim 2 wherein said actuating means further includes conducting plates positioned above said concentric rings of piezoelectric material in electrical contact with all of said piezoelectric segments included in each ring of said piezoelectric material.

5. An ultrasonic transmitting and receiving device as set forth in claim 1 wherein said piezoelectric material further comprises a plurality of concentric rings of piezoelectric material arranged in a plateau configuration, positioned above said plate and having substantially the same horizontal cross-sectional outline of said conducting plate, said rings decreasing in average diameter and increasing in distance from said plate in a direction from the outer perimeter of said plate to the inner perimeter.

6. An ultrasonic transmitting and receiving device as set forth in claim 5 wherein said piezoelectric material further comprises means for individual and sequentially actuating each of said rings; means for actuating all of said plurality of concentric rings to provide a radiated pattern of ultrasonic beams that approximates the pattern produced by a lens radiator.

7. An ultrasonic transmitting and receiving device as set forth in claim 6 wherein said means for actuating all of said plurality of concentric rings periodically provides a pulse of ultrasonic radiation which is focused by varying the time relationship of the individual ring's excitations.

8. An ultrasonic transmitting and receiving device as set forth in claim 1 wherein said conducting plate is aluminum.

References Cited
UNITED STATES PATENTS

| 2,320,390 | 6/1943 | Shmurak | 73—67.2 X |
| 2,748,369 | 5/1956 | Smyth | 340—10 |
| 2,961,637 | 11/1960 | Camp | 340—10 |
| 3,019,636 | 2/1962 | Henry | 73—67.7 |
| 3,262,307 | 7/1966 | Hart | 73—67.8 X |
| 3,396,286 | 8/1968 | Anderson | 340—10 X |
| 3,454,459 | 7/1969 | Munier | 340—10 X |
| 3,457,543 | 7/1969 | Akervold et al. | 340—10 |

RICHARD C. QUEISSER, Primary Examiner

A. E. KORKOSZ, Assistant Examiner

U.S. Cl. X.R.

73—71.5; 310—8.3